UNITED STATES PATENT OFFICE.

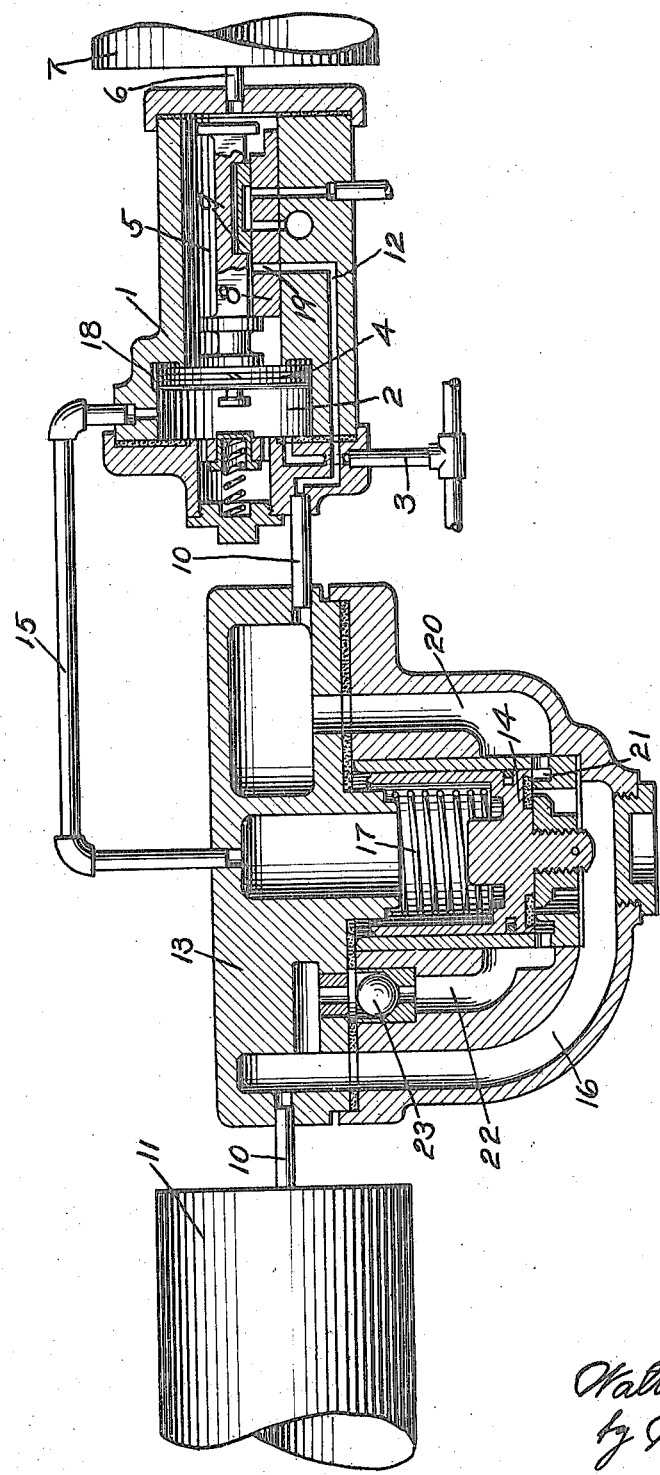

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,265,003.                    Specification of Letters Patent.        Patented May 7, 1918.

Application filed May 12, 1916. Serial No. 96,997.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brakes, of which the following is a specification.

This invention relates to fluid pressure brakes, and more particularly to a brake equipment of the type in which the auxiliary reservoir is recharged from a supplemental reservoir.

With the above type of brake apparatus, if, as is sometimes the case, the supplemental reservoir volume is relatively large as compared with the auxiliary reservoir volume, the supplemental reservoir may equalize into the auxiliary reservoir, in graduating the release after a brake application, at a pressure so nearly equal to the standard brake pipe pressure that a sufficient differential pressure can not be developed in the brake pipe to effect the movement of the triple valve piston from graduated release to release position, and since equalization of pressures between the auxiliary reservoir and the supplemental reservoir generally takes place before the brake cylinder fluid has been fully exhausted, it will be seen that stuck brakes are liable to result.

The principal object of my invention is to provide means for obviating the above difficulty.

In the accompanying drawing, the single figure is a sectional view of a car air brake equipment, showing my improvement applied thereto.

As shown, the equipment may comprise a triple valve device 1, having the usual piston chamber 2, connected to brake pipe 3 and containing piston 4, and a valve chamber 5, connected by pipe 6 to auxiliary reservoir 7 and containing a main slide valve 8 and a graduating valve 9 adapted to be operated by the piston 4.

According to my invention, there is interposed in the pipe 10 leading from the supplemental reservoir 11 to the recharging passage 12 of the triple valve device, a hold back valve device 13 comprising a casing containing a valve piston 14 adapted to seat in opposite directions and subject on one side to brake pipe pressure, supplied through a pipe 15 which may lead to the triple valve piston chamber 2, and on the opposite side to supplemental reservoir pressure supplied through a passage 16. The valve piston 14 is subject on the brake pipe side to the pressure of a coil spring 17 which is adapted to operate the valve piston when the fluid pressure differential is sufficient to insure the release of the brakes, say at five pounds.

In operation, the auxiliary reservoir is charged in the usual manner from the brake pipe by flow through the feed groove 18 around the triple valve piston 4 and fluid is also supplied through pipe 15 to the spring side of the valve piston 14. The supplemental reservoir 11 is charged from the valve chamber 5 through port 19, passage 12, pipe 10, passage 20 and by way of an annular passage 21 around the lower seat of the valve piston 14, through a by-pass 22 containing a check valve 23, the valve piston 14 being normally held seated by the spring 17.

When an application of the brakes is made, the brake pipe pressure is reduced, and the higher pressure of the supplemental reservoir acting below the valve piston 14 operates to shift same to its brake pipe seat.

Upon releasing the brakes the valve piston 14 remains at its brake pipe seat and the quick recharge of the auxiliary reservoir from the supplemental reservoir takes place past the open valve piston 14, but as soon as the supplemental reservoir pressure has fallen to a point at which the brake pipe pressure combined with the pressure of the spring 17 exceeds the supplemental reservoir pressure, the valve piston moves to its supplemental reservoir seat and prevents further flow of air to the auxiliary reservoir.

It will thus be seen that the auxiliary reservoir cannot be recharged to the full standard pressure from the supplemental reservoir, so that when the brake pipe pressure is increased to the maximum pressure in releasing the brakes, a sufficient differential will be created to insure the movement of the triple valve piston to release position.

In release position, the auxiliary reservoir will be fully charged to brake pipe pressure through the feed groove 18 and the supplemental reservoir will also be fully recharged by way of the by-pass 22.

Having now described my invention, what

I claim as new and desire to secure by Letters Patent, is:

1. In a fluid pressure brake, the combination with a brake pipe, auxiliary reservoir, and a valve device subject to the opposing pressures of the brake pipe and auxiliary reservoir for controlling the brakes, of a supplemental reservoir from which fluid is supplied for recharging the auxiliary reservoir and means for limiting the recharge of the auxiliary reservoir to a predetermined degree less than brake pipe pressure.

2. In a fluid pressure brake, the combination with a brake pipe, auxiliary reservoir, and a valve device subject to the opposing pressures of the brake pipe and auxiliary reservoir for controlling the brakes, of a supplemental reservoir normally charged with fluid under pressure from which fluid is supplied for recharging the auxiliary reservoir and a valve device for cutting off the flow of fluid to the auxiliary reservoir when the pressure in the supplemental reservoir has reduced to a predetermined degree.

3. In a fluid pressure brake, the combination with a brake pipe, auxiliary reservoir, and a valve device subject to the opposing pressures of the brake pipe and auxiliary reservoir for controlling the brakes, of a supplemental reservoir normally charged with fluid under pressure from which fluid is supplied to the auxiliary reservoir, and a valve device subject on one side to the pressure of a spring and brake pipe pressure and on the opposite side to supplemental reservoir pressure for controlling the admission of fluid from the supplemental reservoir to the auxiliary reservoir.

4. In a fluid pressure brake, the combination with a brake pipe, auxiliary reservoir, and a valve device subject to the opposing pressures of the brake pipe and auxiliary reservoir for controlling the brakes, of a supplemental reservoir, a valve piston for controlling the recharge of the auxiliary reservoir from the supplemental reservoir, and a by-pass for charging the supplemental reservoir from the auxiliary reservoir and containing a check valve for preventing back flow from the supplemental reservoir to the auxiliary reservoir.

In testimony whereof I have hereunto set my hand.

WALTER V. TURNER.

Copies of this patent may be obtained for five cents each, by addressing the "Commissioner of Patents, Washington, D. C."